March 12, 1968 W. D. CLINTON ET AL 3,372,591
FLOWMETER
Filed Sept. 28, 1965
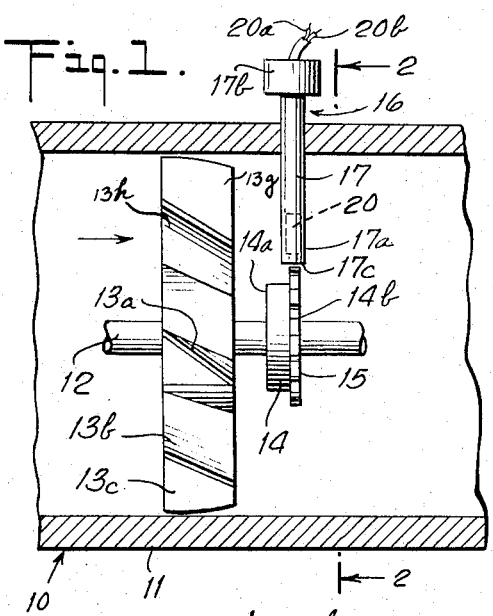
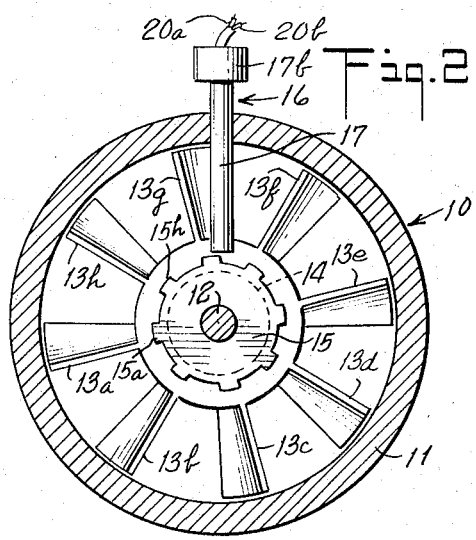
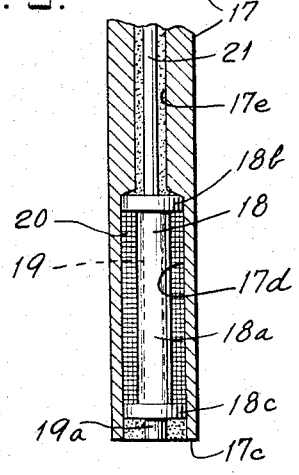
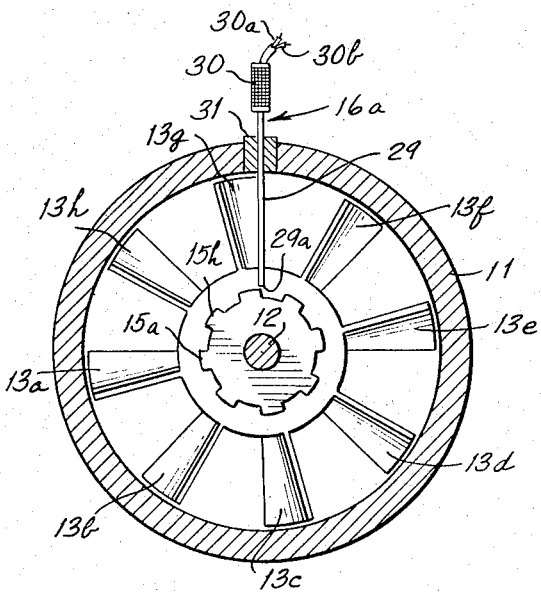
INVENTORS
WILLIAM D. CLINTON
WILLIAM P. SOMERS
Lester W. Clark
ATTORNEY

# United States Patent Office 3,372,591
Patented Mar. 12, 1968

3,372,591
FLOWMETER
William D. Clinton, Guilford, Conn., and William P.
Somers, Prospect Heights, Ill., assignors to Neptune
Meter Company, New York, N.Y., a corporation of
New Jersey
Filed Sept. 28, 1965, Ser. No. 490,991
1 Claim. (Cl. 73—231)

ABSTRACT OF THE DISCLOSURE

A flowmeter of the type wherein a housing forms a fluid conduit for fluid flow therethrough in a fluid zone therewithin, and a bladed shaft is mounted within the fluid zone in the housing including a plurality of vanes responsive to fluid flow parallel to the shaft by causing rotation thereof, further characterized by a pole-piece carried coaxially on the shaft within the fluid zone for rotation therewith and including a plurality of circumferentially spaced teeth disposed outwardly relative to the shaft, a magnetized body carried coaxially on the shaft within the fluid zone for rotation therewith and including a first pole in communication with the pole-piece and a second pole spaced along the shaft therefrom, a magnetically permeable core supported from the housing and directed into the fluid zone toward the shaft at a position therealong occupied by the teeth, the inward end of the core being closely spaced relative to the annulus of the radial extreme of the teeth, and a coil of wire coaxially disposed on the core. In one form the coil of wire is located immediately adjacent to the inward end of the core, while in another form it is located outside of the fluid zone. The hub portion of the shaft to which the vanes are connected has a greater outer diameter than the outer diameter of the pole-piece, and the outer diameter of the magnetized body is smaller than the outer diameter of the pole-piece at the base of the teeth. Since the pole-piece is the rotating body while the magnetically permeable core is the stationary body, the field of flux surrounding the coil opens and closes completely as individual pole-piece teeth, into and out of alignment with the core, thereby giving great sensitivity to the apparatus.

Background of the invention

Turbine flowmeters are known, and typically include an axially mounted, bladed rotor installed in the fluid conduit so that the fluid to be measured causes the rotor to revolve. The rate of rotation of the rotor is directly proportional to the rate of flow of the fluid, and the total angle of rotation of the rotor is directly proportional to the total flow of fluid.

Sensing the exact amount and rate of rotation of the bladed rotor has been a problem. The sensing means should impose no torque on the rotor, should be capable of billions of cycles of rotor rotation measurement without mechanical failure of any kind, and should be mechanically incapable of giving false indications. The flow measuring device according to the present invention incorporates sensing means capable of attaining these desired ends.

Prior art sensing devices are known wherein a rotating member comes into and out of alignment with a probe comprising a magnet, thereby varying the flux lines about the magnet to cause a signal to be generated in a coil upon the magnet. However, the variation in the shape of the envelope of flux lines under such a system is small, and accordingly the sensitivity of such a system is low. On the other hand, the present invention provides that the magnet is the rotating body and that the probe is merely magnetically permeable, so that the flux pattern about the probe core opens and closes completely, thereby generating a large fluctuation in the signal at the coil, for great sensitivity. There are further distinctions over the prior art as will be more fully understood as the detailed description of the invention proceeds.

It is an object of the invention to provide an improved flow measuring device.

Another object of the invention is to provide such a flow measuring device incorporating improved sensing means.

Another object of the invention is to provide sensing means for such a flow measuring device, which sensing means is of simplified construction, of improved sensitivity, and capable of long life without mechanical failure or false indications.

These and other objects of the invention will become more clear as the detailed description of illustrative embodiments thereof is set forth hereinbelow in connection with the drawing, in which:

FIG. 1 is a partial section view of a flow measuring device showing a first embodiment of a sensing means according to the invention;

FIG. 2 is a section view of the device of FIG. 1 taken along plane 2—2 therein;

FIG. 3 is an enlarged section view of a portion of the sensing means shown in FIG. 1; and FIG. 4 is a section view corresponding to that of FIG. 2, and showing a second embodiment of the sensing means according to the invention.

Referring now to the figures, a portion of a flow measuring device according to the invention is indicated generally at 10. The flow measuring device 10 includes an outer cylindrical casing 11 surrounding a coaxially mounted shaft 12, upon which is fixedly mounted for rotation therewith a hub 13 carrying a plurality of blades 13a through 13h. The casing 11 is adapted to accommodate fluid flow in the direction indicated by the arrow in FIG. 1, and the blades 13a through 13h are appropriately pitched and curved to cause counterclockwise rotation of shaft 12, viewed in the direction of flow of the fluid within casing 11. As is illustrated in the copending application of Clinton, filed on even date herewith, Ser. No. 490,962, and assigned to a common assignee with the present application, the shaft 12 is supported within casing 11 by a system of bearings adapted to allow the rotation thereof and the axial retention thereof respectively in response to and in opposition to the force of fluid flow in the direction of the arrow indicated in FIG. 1 against blades 13a through 13h.

Coaxially mounted for rotation with shaft 12 on the downstream side thereof is a cylindrical magnetized body 14. The body 14 is essentially a short bar magnet, having a first pole at the cylindrical end face 14a and a second pole at the cylindrical end face 14b. The north pole may be at either end 14a or 14b, with the south pole at the other end. A pole-piece 15, in the form of a toothed disc, is coaxially mounted upon shaft 12 so that one face of pole-piece 15 is in flush contact with end face 14b of the magnetized body 14. Pole-piece 15 includes a plurality of equispaced peripheral radial teeth 15a through 15h, each of which is approximately rectangular in outline, but with the radially outermost surface thereof being slightly curved so as to conform to a single radius of curvature from the center of shaft 12.

A first embodiment of a sensing means indicated generally at 16 in FIGS. 1–3, comprises an elongated probe 17 which is sealed into the wall of casing 11 with a first end 17a projecting inwardly toward shaft 12, and a second larger diameter end 17b projecting outwardly from casing 11. End 17a is arranged in close proximity to the annulus swept out by the rotation of teeth 15a–15h relative to shaft 12, so that an end face 17c thereof faces each tooth 15a–15h as it comes into radial alignment with probe 17. The gap between the end face 17c and each of teeth 15a–15h is desirably kept as small as is possible consistent with tolerances on the rotating support of shaft 12. The sensing means 16 may be arranged to form a fluid-tight seal with casing 11 by any of the known expedients, such as O-rings or the like. In some situations it may be desirable to permanently seal the sensing means 16 to the casing 11 with an appropriate sealing compound, but in most situations it will be desirable to provide removable sealing means so that the sensing means 16 may be removed from the casing 11 for replacement, repair, or inspection.

Referring now to FIG. 3, the internal details of sensing means 16 include a major diameter bore 17d coaxially located within end 17a of elongated probe 17, communicating with the exterior of probe 17 at surface 17c. A minor bore 17e extends from bore 17d coaxially along the remaining length of sensing means 16 and communicates with the exterior of probe 17 at end 17b. Located within major bore 17d is a coil form 18 preferably fabricated in a relatively inert insulating material such as nylon, and having a generally spool-shaped outline with a cylindrical central portion 18a surmounted at the opposed ends thereof by a pair of disc flanges 18b and 18c, which flanges provide a close fit within major bore 17d of sensing means 16. Secured coaxially within the cylindrical portion 18a of coil form 18 is a core 19 fabricated in a high-permeability magnetic substance. Core 19 extends through and beyond flange 18c at an end thereof 19a, which end is terminated in the plane of the end face 17c of the sensing means 16. A coil of insulated wire 20 fills the annulus bounded by the cylindrical portion 18a, the major bore 17d, and the flanges 18b and 18c. The two ends of coil 20 pass out through flange 18b and along minor bore 17e within an insulating jacket 21 to end 17b where they are terminated at 20a and 20b. The ends 20a and 20b may be connected to appropriate terminals (not shown) so that a signal across the ends 20a, 20b may be utilized for any suitable purpose, as hereinafter described. The annulus between insulating jacket 21 and minor bore 17e, and the annulus between end 19a of core 19 and major bore 17d, are both potted with an appropriate potting compound, such as an epoxy, so that no voids are included within the sensing means 16.

When shaft 12 is rotated, teeth 15a–15h are rotated past face 17c of probe 17, thus causing a series of confrontations between successive ones of teeth 15a–15h and the end 19a of core 19. The flux path between magnetic pole faces 14a and 14b is varied circumferentially by the effect of teeth 15a–15h. Thus, the flux path from magnet face 14a through pole-piece 15 and to magnet face 14b is warped radially outward from shaft 12 at each of teeth 15a–15h, relative to the flux path at the regions of pole-piece 15 between each pair of the aforesaid teeth. The effect is such that as the shaft 12 with magnet 14 and pole-piece 15 affixed thereto is rotated, the core end 19a is subjected to a variation in flux density which corresponds exactly to the presence or absence of a tooth 15a–15h immediately therebelow.

The succession of teeth 15a–15h passing beneath sensing means 16 produces a periodic waveform detectable at coil ends 20a, 20b. The frequency of this waveform is proportional to the frequency of rotation of shaft 12 and thereby to the rate of flow of fluid in casing 11, and the total number of peaks in the waveform is proportional to the total number of revolutions of shaft 12 and thereby to the total flow through casing 11. The waveform may be produced in coil 20 by the inductive action of the variation in the flux from magnet 14 intercepted by core 19 as teeth 15a–15h pass thereunder. A signal is thereby generated at coil ends 20a, 20b. Alternatively, the reluctance of coil 20 may be varied by the presence or absense of a tooth 15a–15h in proximity to core 19.

This variation in reluctance will be reflected in the electrical characteristics at coil ends 20a, 20b. The two effects suppose the same illustrated apparatus, and are closely related phenomena. The choice as to which effect is utilized depends only upon the particular electronic detection circuit (not shown) chosen to detect and utilize the effect at coil ends 20a, 20b. The equipment and its operation are the same, and the terms inductance and inductive action will accordingly be understood to include, for purposes of the present invention, reluctance and reluctance action.

By placing coil 20 in the immediate proximity of teeth 15a–15h the sensitivity of the coil thereto is increased so that noise interference is sharply reduced. This allows the magnet 14 and the pole-piece 15 to be reduced in diameter, thus compensating for the introduction of sensing means 16 into the fluid stream. The proportions of the sensing means parts have been increased for clarity of illustration, and it is feasible to produce sensing means 16 having a cylindrical diameter considerably reduced from that shown in the figures. Outside diameters of 0.1 inch are entirely practical. These dimensions are mentioned by way of example only, to illustrate the fact that while the sensing means 16 includes the coil 20 therein, thus tending to increase the diameter of probe 17, the increase in sensitivity by reduction of the length of core 19 allows a smaller coil, thus compensating for the inclusion of the coil 20 in the probe 17 itself. The effect is that the sensing means 16 does not interfere with the fluid flow within the casing 11. In practice the proportions will be varied to suit a variety of considerations.

In the illustrated embodiments the teeth 15a–15h are shown equal in number to, and aligned with, the blades 13a–13h. It is a feature of the invention that the number of teeth may be varied independently of the number of blades, and that no alignment therebetween is necessary. This is an important advantage, since the number of blades and the number of teeth have to satisfy distinctly different design criteria, and there is no necessary relation therebetween. Thus, with the present invention, the number of blades may be chosen to suit fluid dynamic considerations, while the number of teeth may be chosen to satisfy instrumentation considerations such as frequency of the waveform or signal to noise ratio.

In FIG. 4 there is shown at 16a a second embodiment of the sensing means. In this embodiment a high permeability magnetic core 29, corresponding to core 19 in the first embodiment, extends radially from an end 29a in close proximity to the annulus swept out by teeth 15a–15h, to an opposed end located outside casing 11 and surrounded by a coil 30 which is similar to coil 20 of the first embodiment. When casing 11 is fabricated in a non-magnetic material, the core 29 may pass directly therethrough. In the illustrated embodiment, it is presumed that the casing 11 is fabricated in a magnetic material such as steel, and a non-magnetic plug 31 is inserted therethrough to act as a magnetic window therein so that flux communicated through core 29 is not dissipated in casing 11. Such a plug 31 may be constructed in a non-magnetic metal such as brass, or in an insulating material such as nylon.

In this second embodiment the flux increase which is presented when each of teeth 15a–15h is brought in turn under end 29a, is conducted along core 29 outside of casing 11 and to coil 30 where it induces a corresponding change in the waveform at coil ends 30a and 30b. In general, the waveform produced by coil 30 in response to the turning of shaft 12 will be the same as the waveform produced by coil 20 in response thereto. As previously mentioned, the coil 20 is advantageously located close to teeth 15a–15h so that noise interference is not a problem. On the other hand, the location of coil 30 without casing 11 reduces the outline of the sensing means within the fluid stream in that core 29 is, other things being equal, slimmer than probe 17. The balancing of these desired characteristics favors employment of the embodiment of FIG. 4 for flow measuring devices according to the invention having a very small internal diameter for casing 11 and the employment of the embodiment of FIGS. 1 through 3 for flow measuring devices having a larger internal diameter for casing 11.

The description of the invention has been illustrative, not limiting. The invention may take other physical forms within the scope of the principles set forth above. Such variations are contemplated and claimed herein.

What is claimed is:
1. A flowmeter, comprising:
   (a) a housing, forming a fluid conduit for fluid flow therethrough in a fluid zone within the housing;
   (b) a shaft mounted within the fluid zone in said housing, including a hub portion and a plurality of vanes connected to said shaft at said hub portion responsive to fluid flow parallel to said shaft by causing rotation thereof;
   (c) a pole-piece carried coaxially on said shaft within said fluid zone for rotation therewith, having an outer diameter less than the diameter of said hub, including a plurality of circumferentially spaced teeth disposed outwardly relative to said shaft;
   (d) a magnetized body carried coaxially on said shaft within said fluid zone for rotation therewith, having an outer diameter less than that of said pole-piece at the base of said teeth, including a first pole in communication with said pole-piece and a second pole spaced along said shaft therefrom;
   (e) a magnetically permeable core supported from said housing and directed into said fluid zone toward said shaft at a position therealong occupied by said teeth, the inward end of said core being closely spaced relative to the annulus of the radial extreme of said teeth; and
   (f) a coil of wire coaxially disposed on said core immediately adjacent said inward end thereof within said fluid zone, having leads extending outwardly of said housing.

References Cited
UNITED STATES PATENTS

| | | | |
|---|---|---|---|
| 2,683,224 | 7/1954 | Cole | 73—231 X |
| 3,131,561 | 5/1964 | Romanowski | 73—229 |
| 3,256,737 | 6/1966 | Sipin | 73—231 |

FOREIGN PATENTS

| | | |
|---|---|---|
| 1,197,286 | 6/1959 | France. |

RICHARD C. QUEISSER, *Primary Examiner.*

E. D. GILHOOLY, *Assistant Examiner.*